United States Patent [19]
Miller et al.

[11] Patent Number: 5,325,130
[45] Date of Patent: Jun. 28, 1994

[54] GHOST CANCELLER

[75] Inventors: Robert L. Miller, Bowie; Carl E. Nothnick, Pasadena, both of Md.

[73] Assignee: Westinghouse Electric Corporation, Pittsburgh, Pa.

[21] Appl. No.: 40,707

[22] Filed: Mar. 31, 1993

[51] Int. Cl.$^5$ .............................................. H04N 5/21
[52] U.S. Cl. ................... 348/614; 257/183.1
[58] Field of Search ............... 257/183.1, 245; 348/614; H04N 5/21

[56] References Cited

U.S. PATENT DOCUMENTS 4,060,833  11/1977  Onyshkevych ........................ 348/614
5,073,807  12/1991  Fliegel et al. ........................ 257/245

OTHER PUBLICATIONS

Westinghouse Electric Corporation, ESG, "Proposal For Heterojunction Act Equalizer For HDDT" In Response to DARPA BAA#91-06, HDDT Topic Area#4: Processors, (Jun. 4, 1991).
Ciciora, W, Sgrignoli, G, Thomas, W "A Tutorial on Ghost Cancelling in Television Systems", IEEE 0098-3063/79/0400-0009, (Jan. 12, 1979).
Miller, R. L., Bailey, D. S., Blais, P, Henry, G, Sopira, M., Eldridge, G, Messham, R "Critical Fabrication Processes For Programmable HACT DPTFS", IEEE 1051-0117/91/0000-0031, 1991 Ultrasonics Symposium.
Cullen, D. E., Miller, M. J., "First HACT Analog Memory Devices Demonstrated" IEEE Ultrasonics Symposium, Orlando, Fla. (Dec. 8-11, 1991).

*Primary Examiner*—Mark R. Powell
*Attorney, Agent, or Firm*—David G. Maire

[57] ABSTRACT

A ghost canceller which operates at IF and utilizes a storage mode heterojunction acoustic charge transport device (SM-HACT). The signal delay provided by the SM-HACT is increased by the operation of barrier electrodes which delay the movement of charge packets across the device, thereby eliminating the need for additional digital equalization. The tap weights of the SM-HACT are determined by the operation of a fixed correlator which responds to ghosts in a predetermined training waveform.

10 Claims, 11 Drawing Sheets

GHOST CANCELLER

BACKGROUND OF THE INVENTION

This invention relates generally to the field of waveform equalization, and more specifically to the field of ghost cancelers for television, and more specifically to a storage-mode acoustic charge transport device used as a ghost canceller for television.

Ghosts in television images are caused by multi-path transmission channels. In general, they are time-delayed, attenuated, and distorted versions of the intended signal. They also can be time-varying when caused by reflections from moving objects, for example airplane flutter. In conventional NTSC or analog HDTV they are an irritating nuisance which can seriously impair picture quality and visibility. In the case of terrestrial broadcast of analog HDTV signals, even small amounts of multipath can reduce the picture quality to a level which is no better than present day NTSC.

In digital HDTV broadcasts the situation is even more serious, since digital schemes do not degrade gracefully under signal impairment as do analog transmission systems. This is especially true of the digital HDTV broadcast systems which utilize bandwidth compression techniques such as Huffman coding and Run-Length Limiting. Such techniques often transmit symbols of varying lengths which represent various signal levels. Signal levels which repeat often are represented by symbols which are only a few bits long, whereas signal levels which occur rarely are represented by longer symbols. In order to decipher a stream of variable length symbols, the receiver decoder must not make any mistake or it can become completely lost.

The ghost problem is forcing HDTV proponents to develop adaptive equalizers, or ghost cancelers, for their systems. They are developing digital equalizers because no satisfactory analog equalizer technology has existed until now. The basic function of an equalizer, to remove the effects of multipath and perhaps other distortions, can be understood in either the time or frequency domain. In the time domain, it may be shown that the equalizer cancels out the distortion components from the received signal by creating a copy of just the distortion components, and then subtracting this from the incoming signal. In the frequency domain, the undesired signal components cause the frequency response of the transmission channel to be distorted, usually having periodic ripples in the channel's frequency response. The function of an equalizer may be viewed in the frequency domain as an inverse filter, having ripples in its frequency response which are exactly opposite to those of the distorted transmission channel. When this equalizer is used in the receiver, the product of the channel's frequency response and that of the equalizer will be flat. The time domain and frequency domain explanations of an equalizer are entirely equivalent.

A key component of an equalizer is a Programmable Transversal Filter or PTF. Required characteristics of a PTF include the following:

its bandwidth must be wide enough to handle the signals of interest;

it must contain enough independently programmable taps, spaced close enough to create an accurate replica of the distortion (ghost) signal;

its tap weight magnitudes must have sufficient resolution to create an accurate replica of the ghost signals; and it must be sufficiently long to recreate the expected delays of the distortion signals.

There has been an appreciable effort over the past decade to develop ghost cancelers for NTSC television. Most of the approaches have been done at baseband, after the video detector. Baseband operation in itself creates problems. Envelope detection cannot be used, because it freezes into the detected signal artifacts which are caused by interaction between the desired signal and the ghost. These artifacts cannot be removed subsequently by a linear operation. Synchronous detection must therefore be used if baseband ghost cancellation is to be employed. However, carrier phase recovery is disturbed by the presence of ghosts. A narrow-band synchronous detector will detect on the average phase of the received signal, which depends on the relative amplitude and carrier phase of any ghost signals present. As a result, quadrature components will appear at the output of the synchronous detector for all but a few trivial cases. Multiple transversal filters must be used to handle in-phase and quadrature components. In addition, cross terms in ghosted baseband video require four transversal filters in a lattice configuration to completely cancel the interfering signals.

The BTA (Japanese equivalent of the U.S. National Association of Broadcasters) has proposed an NTSC ghost canceler based on baseband digital signal processing technology. However, digital transversal equalizers are expensive and slow. A digitally programmable analog transversal equalizer technology is needed, with satisfactory performance and affordable cost.

SUMMARY OF THE INVENTION

In light of the performance limitations of the existing technology, it is an object of this invention to provide a ghost canceller which operates at RF or IF frequency. It is a further object of this invention to provide a ghost canceller which provides high performance, fast convergence, and lower cost when compared to baseband digital approaches.

A ghost canceller is described herein which has a signal input means, a filter means, a summing means, and a signal output means. The output of the signal input means and the output of the filter means are inputs to the summing means, and the output of the summing means is the input to the filter means and the output means. The filter means contains a storage mode heterojunction acoustic charge transport (SM-HACT) device which is formed with a substrate, a channel means on the substrate, a charge injecting means which injects charge packets into the channel means in response to the output of the summing means, an acoustic wave means for injecting an acoustic wave into the channel means in order to move the charge packets along the channel means, a plurality of barrier electrode on the channel means which operate when energized to stop the movement of the charge packets, a plurality of nondestructive sense electrodes interspersed among the barrier electrodes on the channel means and operable to sense the charge packets when they are stopped, and a differential output circuit having as input the output of the nondestructive sense electrodes, where the output of the differential output circuit is the output of the filter means. Because the barrier electrodes Serve to extend the signal delay available in the SM-HACT device, this device can be used as a digitally programmable transversal filter in the RF or IF section of a receiver, thereby eliminating the need for the more complex digital equalization after A/D conversion in the receiver.

DESCRIPTION OF THE PREFERRED EMBODIMENTS

Figure 1:
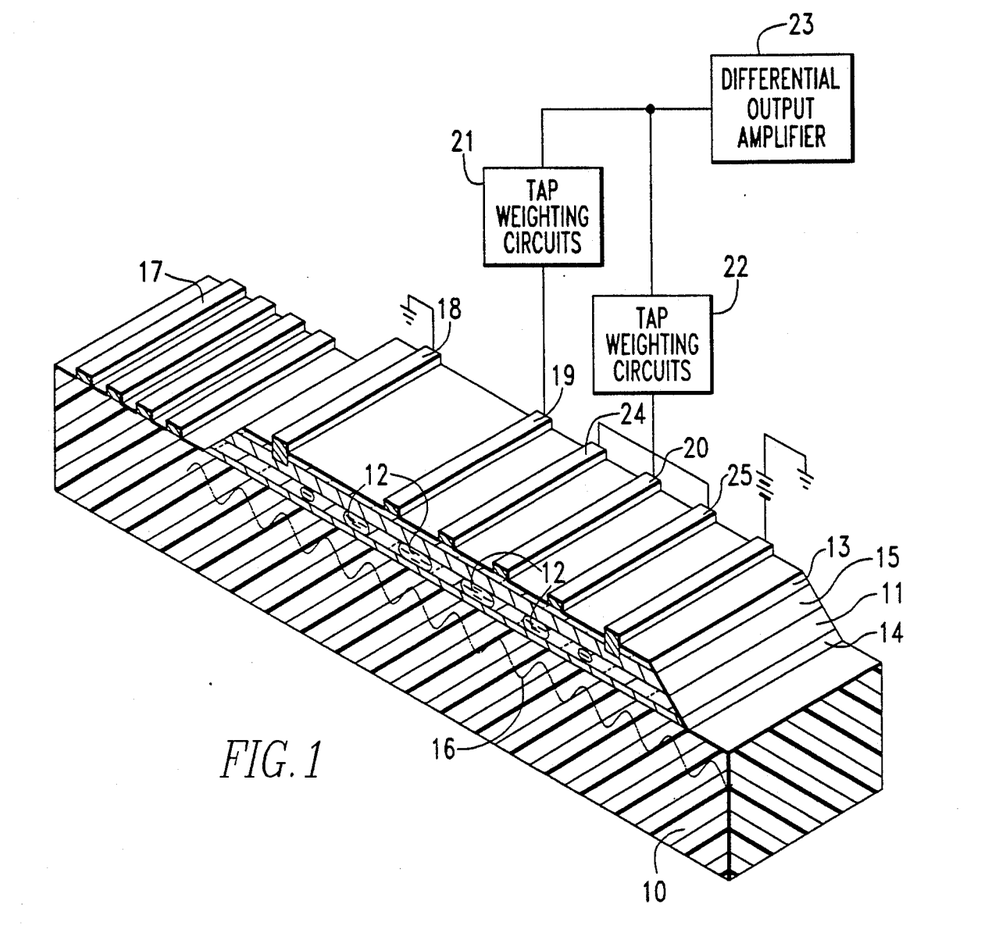
FIG. 1 illustrates a storage mode heterojunction acoustic transport device in accordance with this invention.

This invention involves a novel Storage-Mode Heterojunction Acoustic Charge Transport (SM-HACT) Digitally Programmable Transversal Filter (DPTF) as an equalizer for multi-path signal situations such as radar, communications, electronic warfare and television applications, to be used in the RF or IF section of the receiver before A/D conversion of the signal. FIG. 1 shows a simplified diagram of such a SM-HACT DPTF device. A semiconductor substrate 10 has formed on it a channel 11 for conducting mobile charge packets 12. The substrate 10, channel 11, and overlaying layer 13 may be gallium arsenide, formed with interspersed layers of aluminum gallium arsenide 14,15 by techniques well known in the art. Acoustic carrier waves 16 are generated in the substrate 10 and channel 11 by an RF voltage applied to the interdigital Surface Acoustic Wave (SAW) transducer 17. An input contact 18 is positioned over the channel 11 as a means for injecting a charge into the device. The acoustic waves 16 extract packets of electrons 12 from the input contact 18. A signal voltage applied to the input contact 18 essentially modulates the amount of charge in each packet 12 according to the value of the signal voltage at the precise instant that the charge packet 12 is formed. Nondestructive sensing (NDS) electrodes 19,20 capacitively sense the charge packets 12 as they travel through the channel 11. The weight of the signal generated by each NDS electrode 19,20 may be determined by the physical length of the electrode itself, or the weight may be determined by tap weighting circuitry 21,22, which may be for example a programmable digitally controlled multiplying D/A converter. The output of the tap weighing circuits 21,22 may be connected to the plus and minus inputs of a differential device such as a differential output amplifier 23 to form the transversal filter output.

The device of FIG. 1 operates on RF analog signals over a wide frequency range which is determined by the tap spacing and tap weights. Although the tap weights may be limited in precision by the tap weighting circuitry, the actual multiplication operation at each tap is an analog process, so no roundoff error (roundoff noise) occurs as it does in digital filters. Also, many more taps can be included on a single HACT DPTF chip than on digital filter chips.

The delay provided by the device of FIG. 1 operated in its standard mode could be about 2—3 microseconds. With this amount of delay, additional digital equalization after A/D conversion would be required. A preferred device would provide about 20 microseconds delay. To accomplish this amount of delay, barrier electrodes 24,25 are formed above the channel. These barrier electrodes 24,25, preferably interspensed among the NDS electrodes 19,20, are pulsed periodically to cause the charge packets 12 to progress through the device in a series of hops, thereby increasing the total delay provided by the device. This makes the device appear electrically long, even though it is not physically long.

Figure 2:
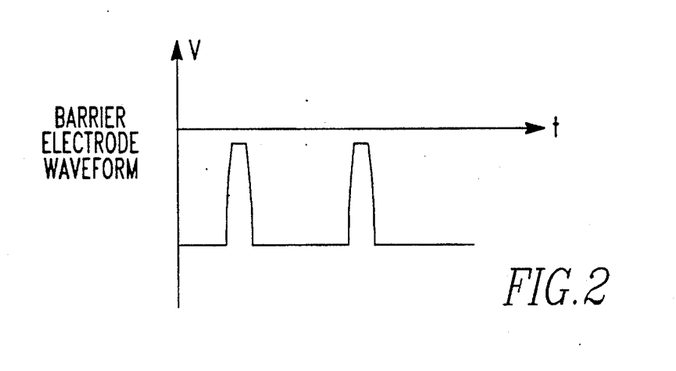
FIG. 2 is a typical barrier electrode waveform for the device of FIG. 1.

In the storage mode of operation, the barrier electrodes 24,25 are driven by the waveform of FIG. 2. Most of the time, the voltage on each barrier electrode 24,25 is sufficiently negative that each charge packet 12 is trapped between two barrier electrodes 24,25, unable to move forward under the influence of the acoustic wave 16. Periodically, the voltage is reduced briefly, enabling the charge packets 12 to move again. Because the charge packets 12 are very close to the top surface in the HACT, the amplitude of the barrier waveform can be less than a volt. In one embodiment, the barrier voltage is reduced just long enough for a packet to move from one storage area to the next, but no farther. The voltage applied to the barrier electrodes 24,25 is then increased to stop the charge packets 12 from moving again, and the cycle repeats. In this cycle, the duration of the part of the barrier waveform corresponding to storage time is relatively uncritical, and can be readily increased or decreased. The duration of the part of the barrier waveform corresponding to motion of the packets is more critical, and the leading and trailing edges of the pulse are preferably synchronized with the acoustic wave. It should be noted that the device of FIG. 1 can be operated in two modes: if the barrier electrodes 24,25 are not pulsed, it can appear approximately 3 microseconds long; if the barrier electrodes 24,25 are pulsed at the proper rate the device can appear much longer, for example 20 microseconds long.

Figure 3A:
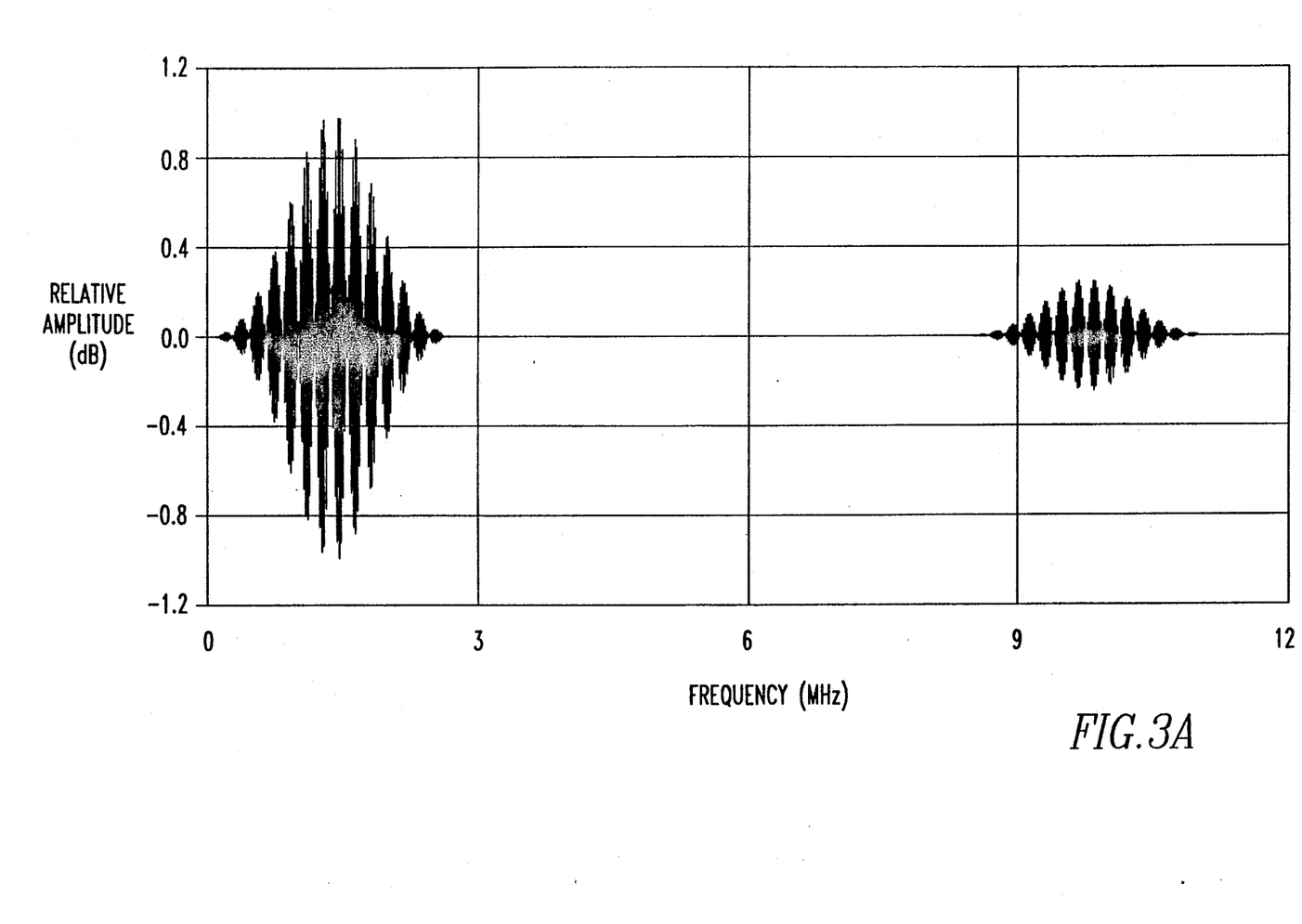
FIG. 3A represents a television input signal with a ghost which is input to the device of FIG. 1.
Figure 3B:
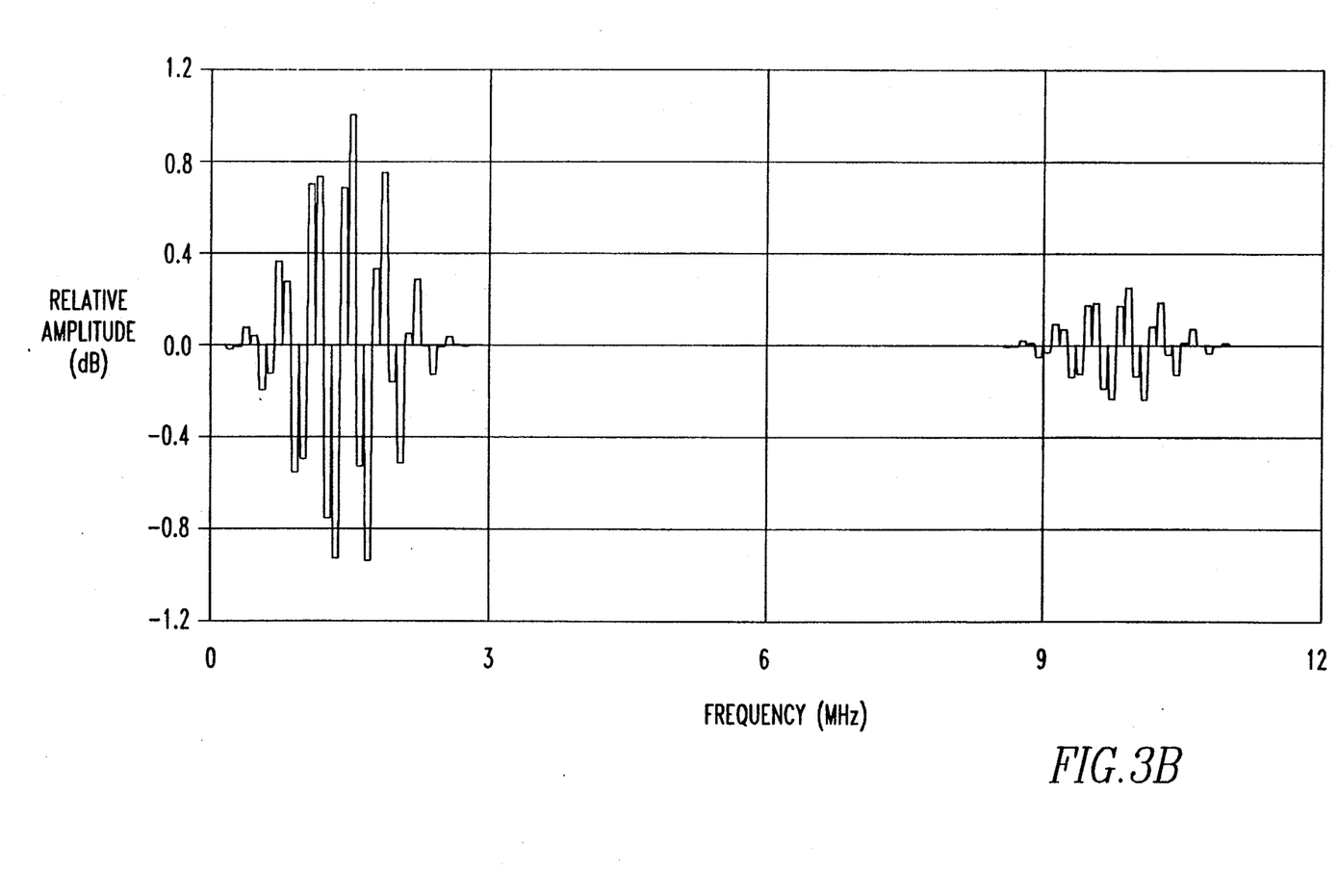
FIG. 3B represents the output of the device of FIG. 1 given the input of FIG. 3A.

The effect of the barrier electrode action on the signal is sort of an "undersample and hold" operation. The repetition rate of the barrier pulses sets the sampling period $T_{samp}$ of the device, which can be an integer multiple of the period $T_{SAW}$ of the acoustic carrier wave. ($T_{SAW}$ would otherwise be the sampling interval, if the barrier electrodes were not pulsed.) During each sample interval, the charge packets are stopped and held stationary by the barrier electrodes for a time $T_{hold}$, during which the output is constant. Note that the charge packet 12 is being sensed while it is being held. FIGS. 3A and 3B show a computer simulation of the effect on a TV IF signal of a storage-mode HACT having one tap fully on (tap weight $a_1=1.0$) and all other tap weights set to zero. In this example, $f_{saw}=91.5$ MHz, which is twice the 45.75 MHz standard TV IF picture carrier frequency; $T_{hold}=7T_{SAW}$, and $T_{samp}=8T_{SAW}$. The input signal shown in FIG. 3A is a 43 MHz RF burst, with a $-20$ dB ghost separated by 10 $\mu$sec. The output signal of FIG. 3B shows the effect of the undersampling operation performed by the SM-HACT.

Figure 4:
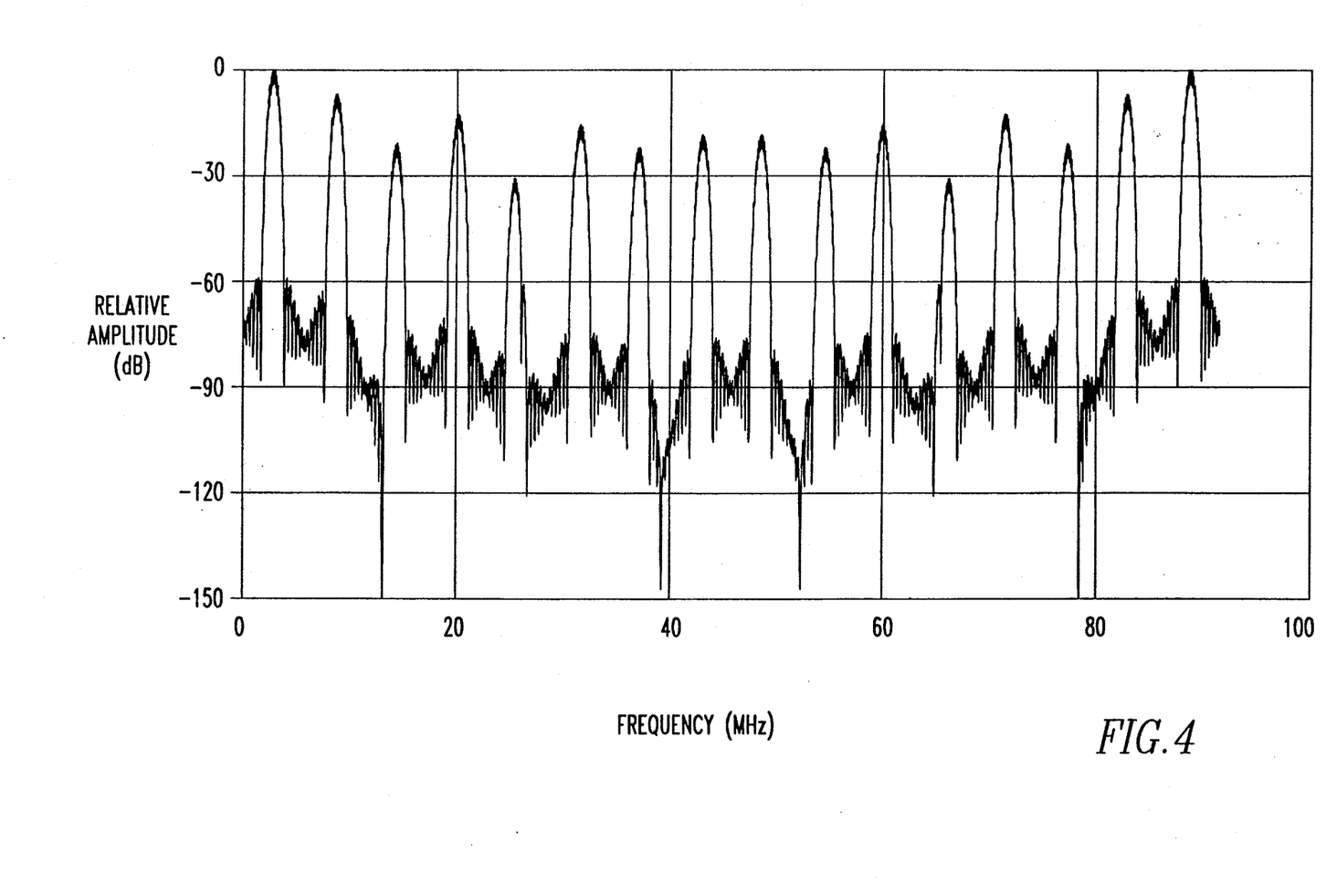
FIG. 4 is the spectrum of the output signal shown in FIG. 3B.

The corresponding spectra are shown in FIG. 4. The spectrum $F(\omega)$ of the input pulse is bandlimited to the TV IF region which is between 39.75 MHz and 47.25 MHz. The undersampling of the SM-HACT produces aliased copies of the input spectrum, at lower and higher frequencies. For a Storage-Mode HACT with N multiple taps of weights $a_k$, the output spectrum is $$S(\omega) = \left[\sum_{p=-\infty}^{\infty} F\left(\omega - \frac{2\pi p}{T_{samp}}\right)\right]\left[\sum_{k=1}^{N} a_k e^{-j\omega k T_{samp}}\right] T_{hold} \frac{\sin(\frac{1}{2}\omega T_{hold})}{(\frac{1}{2}\omega T_{hold})} \quad (1)$$

The $\sin(\chi)/\chi$ rolloff produces less special energy at the IF band than at very low frequencies. If desired, a simple switching circuit may be added to the output of the SM-HACT device to narrow the width of each output pulse thereby increasing the spectral energy available at higher frequencies.

Figure 5:
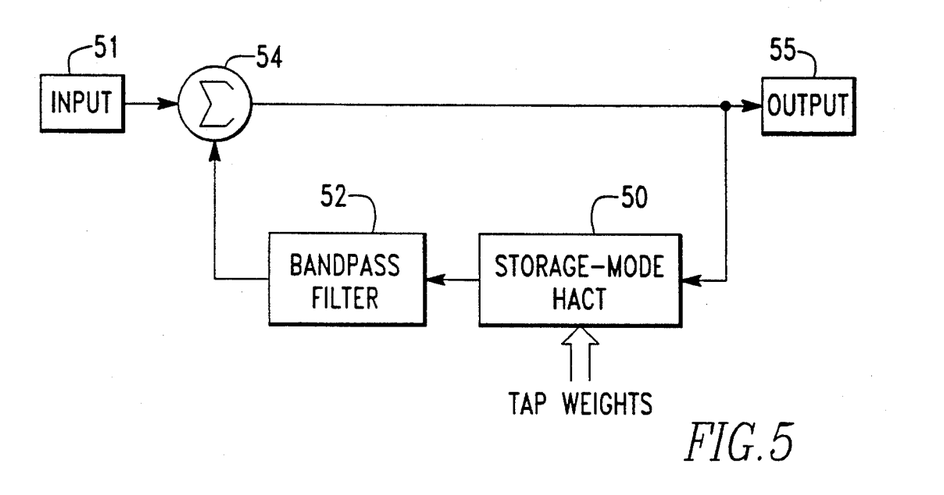
FIG. 5 is block diagram of a feedback canceller loop employing the device of FIG. 1.

The SM-HACT can be used in either a feedforward or feedback configuration. Because the feedback configuration can in principle cancel the ghosts completely, it is the preferred approach. FIG. 5 shows a simplified block diagram of a feedback canceller loop employing a Storage-Mode HACT 50. The output of the SM-HACT 58 may be bandpass filtered 52 before the summing node 54, to remove spectral aliases outside of the TV IF band. This assures that the input 51 and output 55 signals of the loop are only IF frequencies, so that the ghost canceller loop can be readily inserted into standard TV IF sections, with no special design accommodations required.

Many other variations of the basic loop are possible. For example, it should be possible to undersample the input waveform and low-pass filter the SM-HACT output, thereby producing a cancellation loop output at low frequencies (e.g. 2.89 MHz). This might be used to eliminate the synchronous video detector after the loop, allowing direct A/D conversion of the output of the ghost canceller loop.

Figure 6:
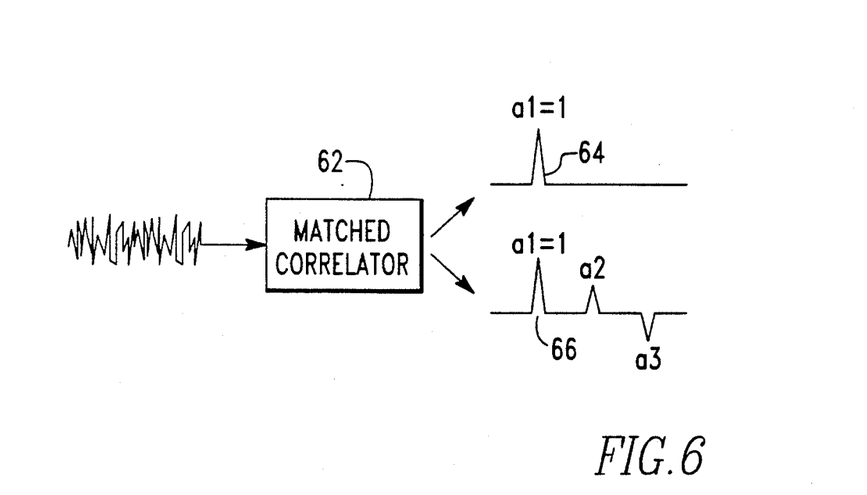
FIG. 6 illustrates the relative times and amplitudes of matched correlation response peaks in response to a training signal input.

Any equalizer system requires a training waveform, and some sort of system to recognize the echoes of this training signal and set the appropriate tap weights in the canceller. Because broadcast HDTV is currently in the development stages, such a training signal will likely be standardized at the same time as the rest of the signal format. One such signal may be a spread spectrum or pulse compression waveform such as a pseudo-noise sequence, shown as item 60 in FIG. 6. A matched correlator 62 in the receiver, which can be either fixed or programmable, gives a sequence of correlation pulses, whose amplitudes and times correspond to the multiple paths of the channel, and which are equal to the tap weights to be programmed into the equalizer. If no ghosts exist, a single correlation spike is produced, as shown by curve 64. Multiple ghosts produce multiple correlation peaks 66. This approach has good noise performance; the ghost measurement dynamic range is improved by the time-bandwidth product of the pulse compression waveform. The matched filter has higher peak power than the rest of the HDTV signal, so it can trigger the ghost measurement sequence independently of any HDTV decoding or synchronization process. This means that even if the ghosting situation is so severe that the TV cannot synchronize for operation, the ghost environment can still be measured and eliminated. These factors allow a system design which can update the equalizer very rapidly.

Figure 7:
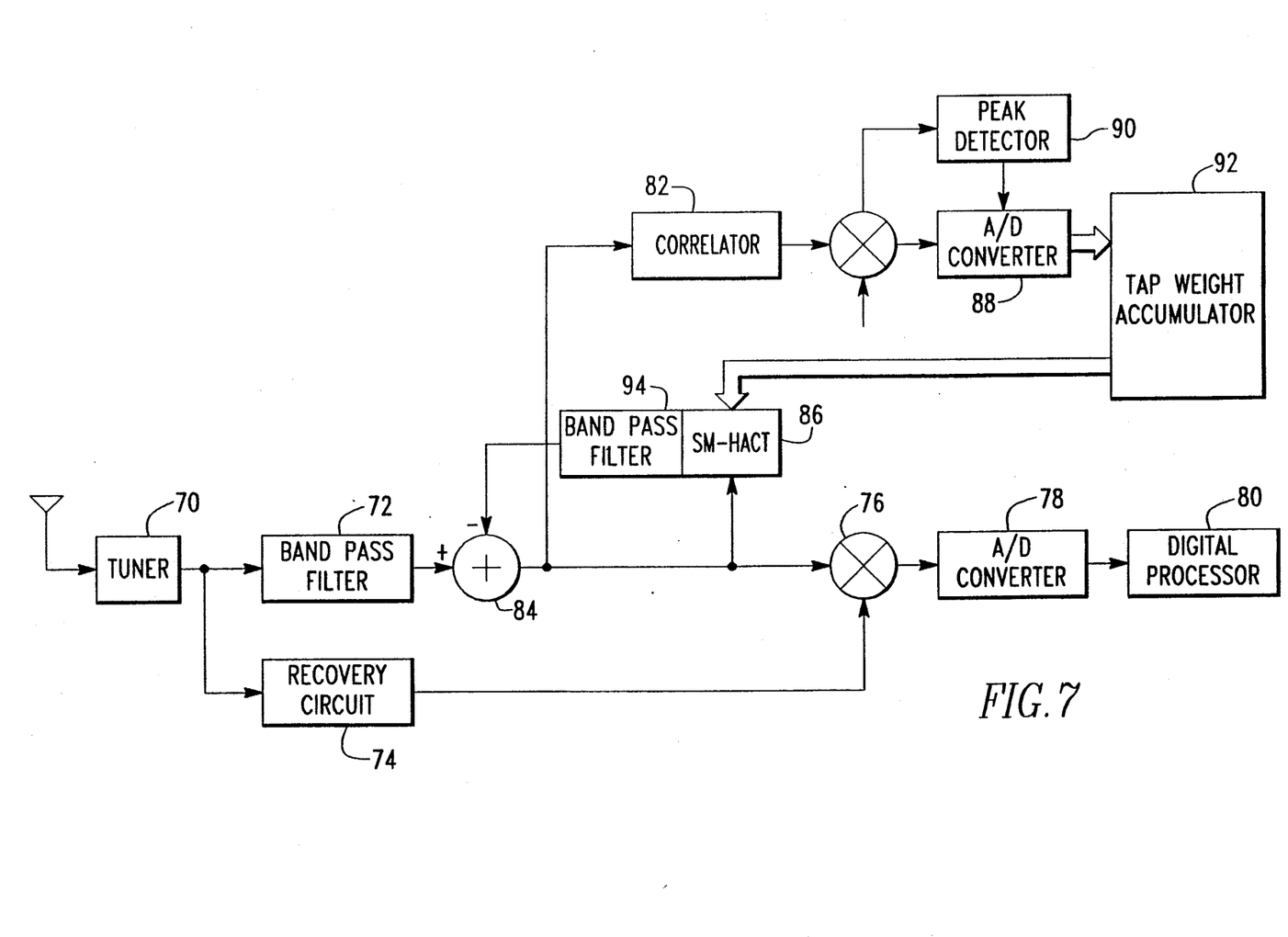
FIG. 7 is a block diagram of how the device of FIG. 1 can be used as a ghost canceler in the IF of an HDTV circuit.

FIG. 7 illustrates how this concept can be used in the IF of a proposed HDTV approach, using a Storage-Mode HACT equalizer. A tuner 70 provides an input signal to an IF section consisting of band pass filter 72, carrier recovery circuit 74, and mixer 76. Filter 72 is typically a SAW filter which provides the main selectivity of the receiver. The combination of carrier recovery circuit 74 and mixer 76 comprise a standard synchronous detection scheme. The base band output signal of the mixer 76 provides an input signal to A/D converter 78 for processing by digital processor 80. The ghost canceller of this invention is inserted between the filter 72 and the mixer 76. A matched correlator 82 looks at the corrected IF signal from downstream of a summation device 84. When the set is first turned on or the channel is changed, the tap weights of the SM-HACT 86 device are set to zero. In this configuration, the feedback loop is open and the corrected IF signal is initially the same as the uncorrected signal. The output of the correlator 82 is digitized by an A/D converter 88 to provide the coefficients for the SM-HACT 86, with the main correlation peak detected by a peak detector 90, triggering the A/D converter 88 which feeds a tap weight accumulator 92. The output of the SM-HACT 86 may be passed through a band pass filter 94 prior to the summation device 84. The first TV frame sets the tap weights very close to the required values, with subsequent frames making small corrections as needed. This allows for very fast equalizer convergence as well as very accurate cancellation after a number of frames.

Figure 8A:
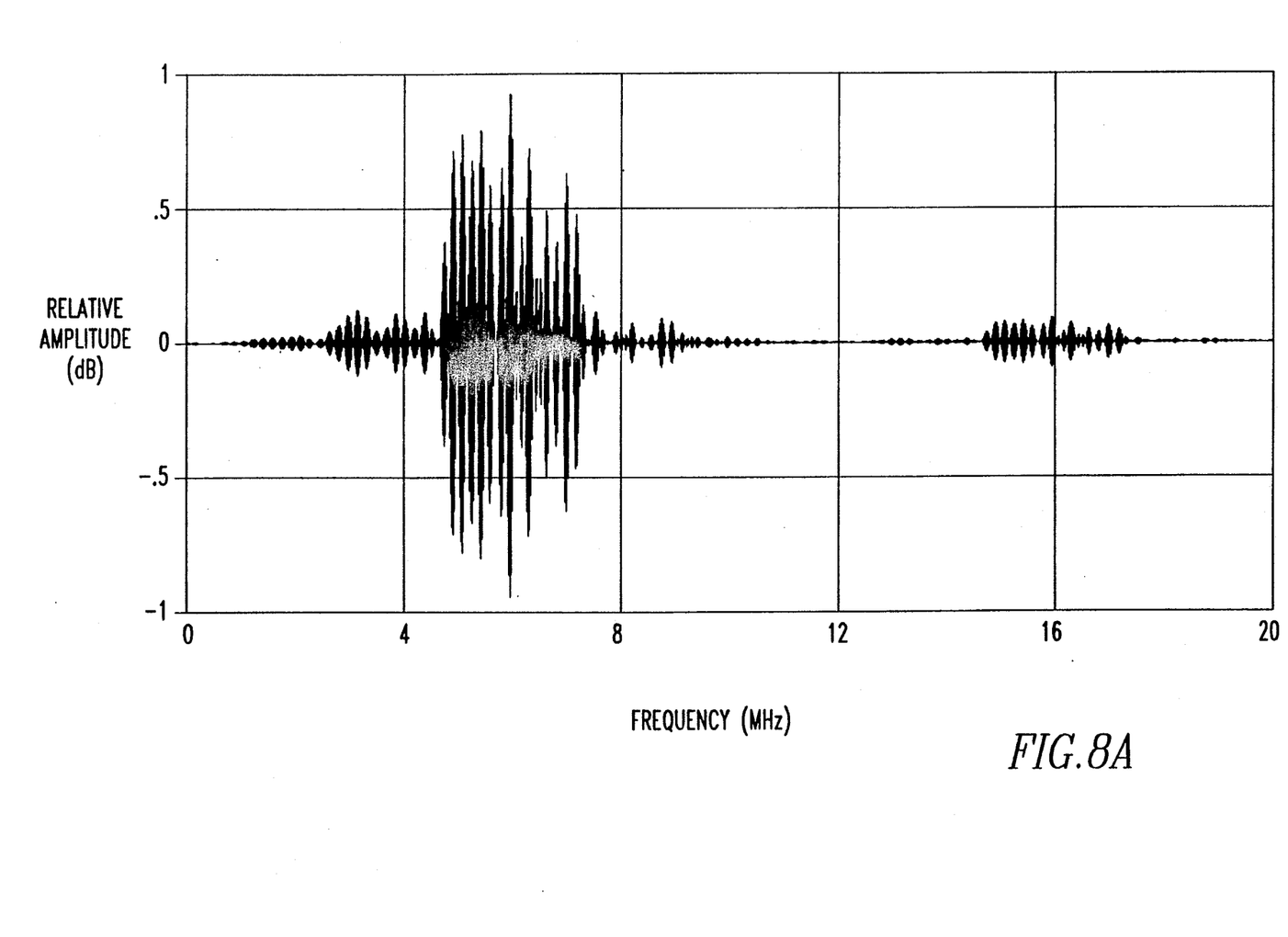
FIG. 8A and 8B are the input IF waveform and its spectrum, respectively, of the circuit of FIG. 7.
Figure 8B:
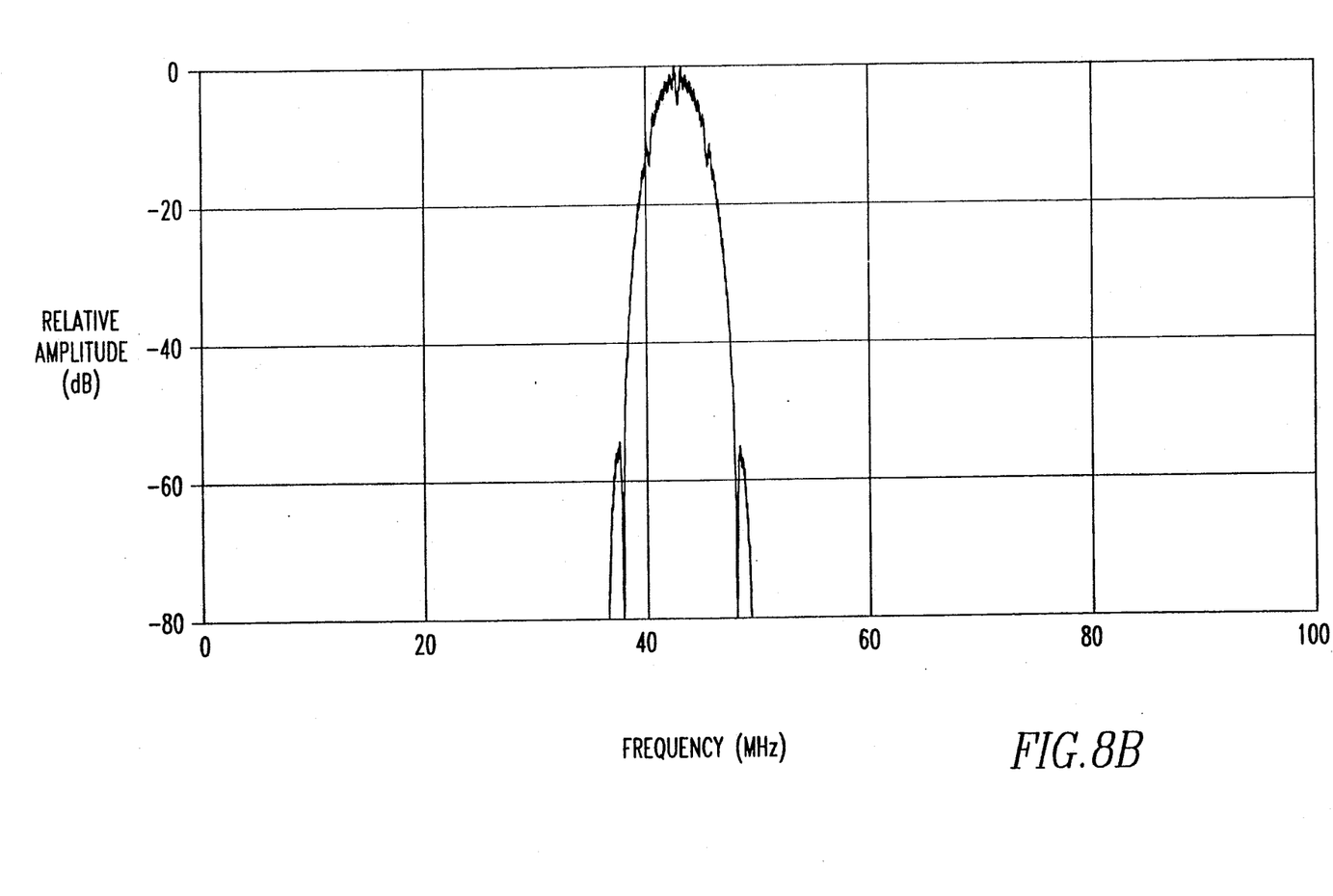
Figure 8C:
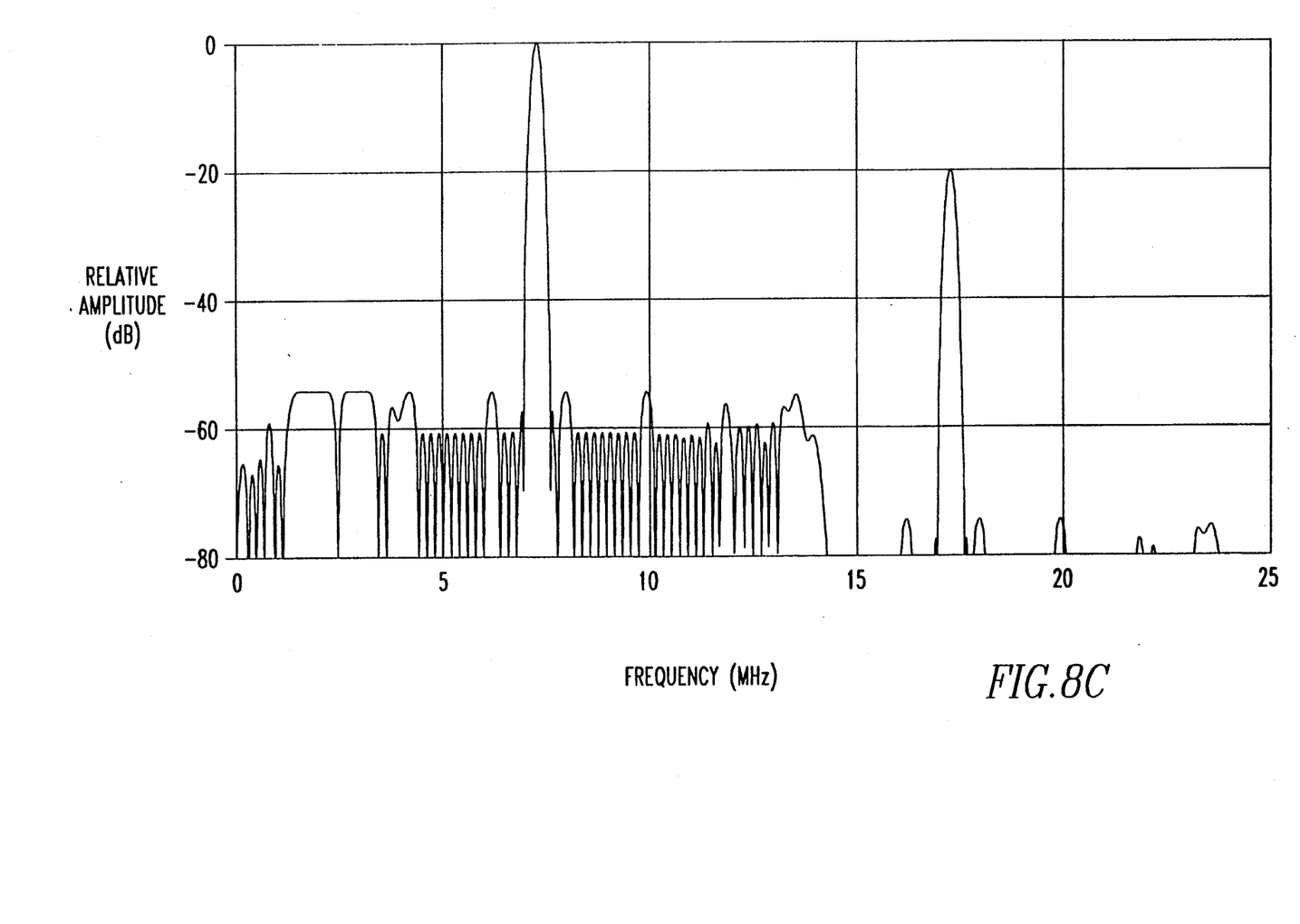
FIG. 8C illustrates the correlation pulses generated by the correlator of the circuit of FIG. 7.
Figure 8D:
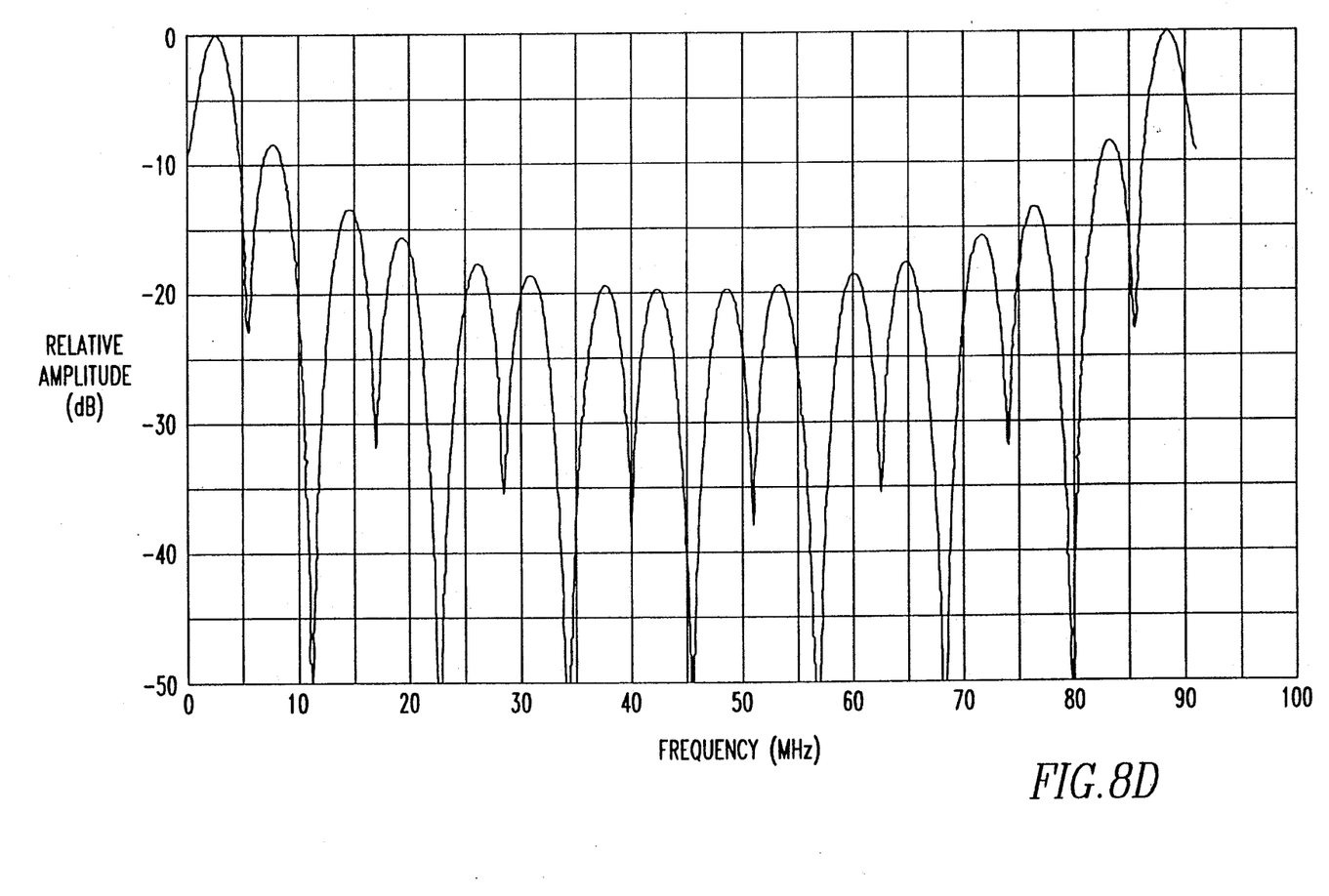
FIG. 8D illustrates the frequency response of the device of FIG. 1 as used in the circuit of FIG. 7.

FIGS. 8A–8E show time domain waveforms or spectra at various points in the system of FIG. 7, as calculated by computer simulation. For this simulation, a 60 bit pseudo-noise training waveform was created, along with a $-20$ dB ghost at a time offset of 10 microseconds. This transmit waveform was band limited by a cosine-cubed filter, to assure that its spectrum fits completely within the allotted 6 MHz TV transmission bandwidth. The input IF waveform and its spectrum are shown in FIGS. 8A and 8B respectively. The training waveform was designed to be correlated with a fixed 13-bit Barker coded biphase correlator (item 73 of FIG. 7), to produce a main correlation pulse with very low time sidelobes, as shown in FIG. 8C. The A/D sampling starts after the main correlation pulse and does not include the main correlation pulse. After downconversion to 2.859 MHz, which is the center frequency of the lowest alias passband of the SM-HACT spectrum that was shown in FIG. 4, the correlation pulse is A/D converted to 8 bits of precision at a rate of 45.75 MHz/4 = 11.4375 MHz = 4×2.859 MHz. A peak detector 90 triggers the loading of the samples into the register of the tap weight accumulator 92, and from there into the tap weight memory of the SM-HACT 86. FIG. 8D shows the frequency response of the SM-HACT as programmed with these tap weights. The output of the cancellation loop, shown in FIG. 8E still contains a small residual ghost that is not completely canceled.

Figure 8E:
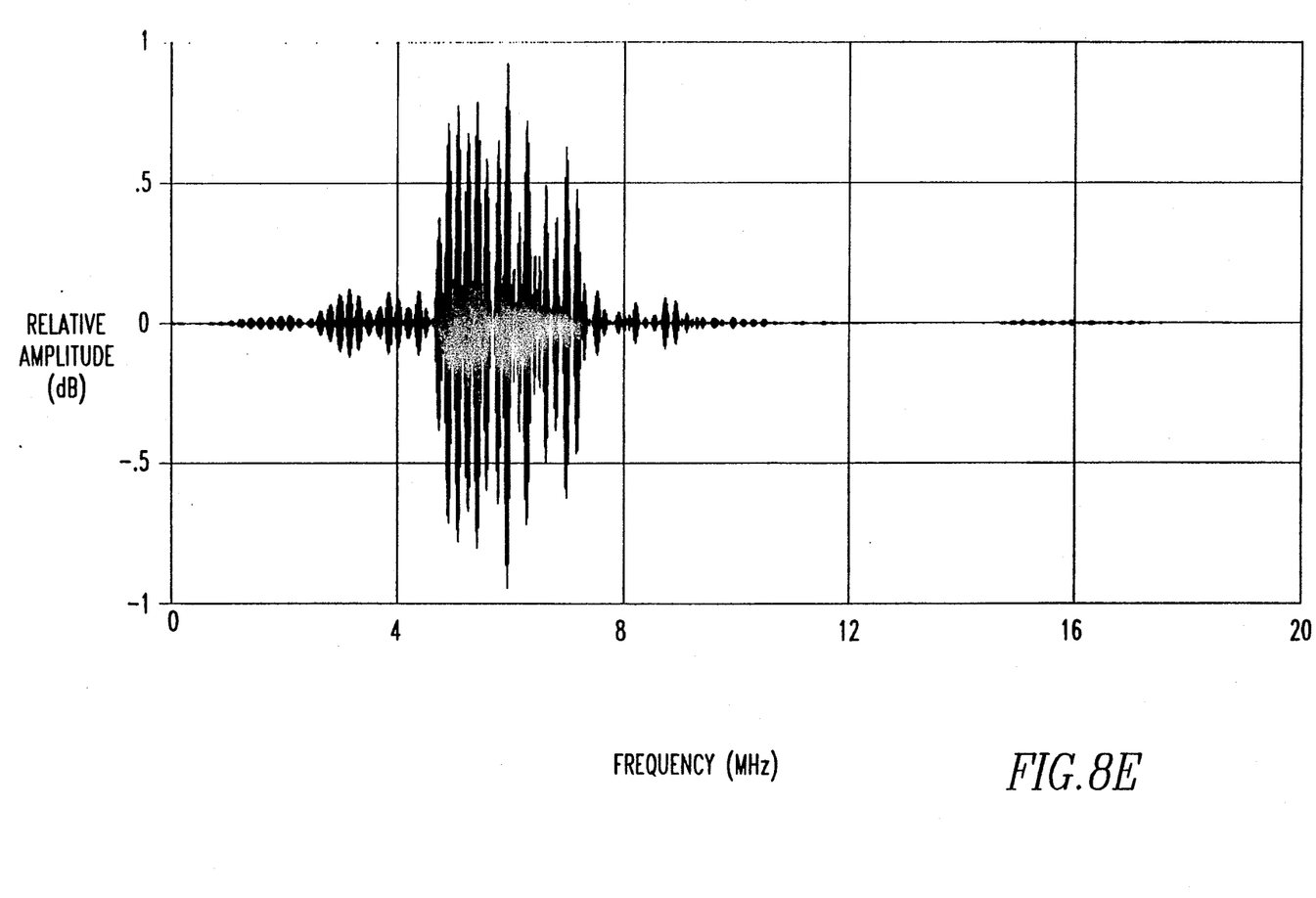
FIG. 8 illustrates the output of the cancellation loop of the circuit of FIG. 7 after one frame of operation.

This waveform would be applied to the correlator 82, creating a large main correlation peak and a smaller residual peak corresponding to the residual ghost. The main correlation peak would trigger the A/D process again before the second frame. The A/D samples from the residual ghost would comprise small corrections that are then added to the contents of the tap weight accumulator 92 which functions to accumulate tap weight signals generated from successive repetition of the training waveform. The contents of this accumulator 92 would then be loaded into the tap weights of the SM-HACT 86, slightly correcting the tap weights which were loaded from the previous training pulse. The modified tap weights provide improved ghost cancellation for the second frame. Before the third frame, a new ghosted training pulse arrives, and the process repeats.

Because a fixed signal format standard already exists for present-day NTSC color TV, the choice of a training signal becomes somewhat restricted, depending on the direction that the TV industry takes. Two options exist: transmit a special training signal which is approved by the FCC, or use the existing TV signal to derive equalizer programming information. The simplest situation would be to derive information from the existing signal to program the equalizer, because it would not require any FCC mandates. Several parts of the video signal, such as the serration pulse edge in the center of line 266, the chroma burst, or the horizontal sync pulses can be used. Of these, the line 266 edge appears to be the most promising. The practical problem with this approach is that all candidates for a training pulse are part of the synchronization signal. When a signal is received by a local TV station as a network feed, the local station strips off the network's sync pulses, and substitutes its own. Accordingly, the ghost canceller can only get rid of multipath distortions which are introduced in the local broadcast process. Any multipath distortions which are introduced in the signal during the network feed cannot be equalized out. This consideration may not be very serious under most situations, but it is not perfect.

A better technical solution is for the originator of the signal to broadcast a carefully designed video training signal, standardized by the FCC, which local broadcasters would leave alone. This would allow an adaptive equalizer to clean up multipath distortions introduced anywhere in the broadcast chain, including network feeds. Such a training signal could be used in a manner similar to the HDTV version discussed in the preceding paragraph, provided that a correlator was used which was matched to the training signal.

The above described embodiments are meant as illustration only and should not be construed to limit the scope of the invention as claimed below.

We claim:

1. An equalizer comprising:
   a signal input means;
   a filter means;
   a summing means; and
   a signal output means;
   wherein an output of said signal input means and an output of said filter means comprise inputs to said summing means, and an output of said summing means comprises input to said filter means and said output means;
   wherein said filter means further comprises a storage mode heterojunction acoustic charge transport device comprising;
   a substrate;
   channel means disposed on said substrate;
   charge injecting means disposed on said channel means for injecting charge packets into said channel means in response to the output of said summing means;
   acoustic wave means for injecting an acoustic wave into said channel means, said acoustic wave operable to move said charge packets along said channel means;
   a plurality of barrier electrodes disposed on said channel means and operable when energized to stop the movement of said charge packets;
   a plurality of nondestructive sense electrodes disposed on said channel means and interspersed among said barrier electrodes, said nondestructive sense electrodes positioned to sense said charge packets when they are stopped by said barrier electrodes;
   a differential output circuit having as input the output of said nondestructive sense electrodes, wherein the output of said differential output circuit comprises said output of said filter means.

2. A device as in claim 1, wherein said signal input means provides a multipath training waveform, and further comprising a correlator means connected to said output of said summing means, said correlator means operable to generate tap weight signals which correspond to the multiple paths of said training waveform, and further comprising tap weighting circuitry operatively connected between said nondestructive sense electrodes and said differential output circuit, said tap weighting circuitry operable to weight the output of said nondestructive sense electrodes in response to said tap weight signals.

3. A device as in claim 2, wherein said correlator means further comprises a tap weight accumulator operable to accumulate tap weight signals generated from successive repetitions of said training waveform, wherein the output of said accumulator comprises the output of said correlator means.

4. A ghost canceller comprising:
   an input means for providing a multipath signal containing a training waveform;
   a summing means having as a first input said multipath signal;
   a storage mode heterojunction acoustic charge transport device comprising a substrate, a channel means disposed on said substrate, a charge injecting means disposed on said channel means and operable to inject charge packets into said channel means in response to the output of said summing means, an acoustic wave means operable to move said charge packets along said channel means, a plurality of barrier electrodes disposed on said channel means and operable when energized to stop the movement of said charge packets, a plurality of nondestructive sense electrodes disposed on said channel means and interspersed among said barrier electrodes and positioned to sense said charge packets when they are stopped by said barrier electrodes, tap weighting circuitry operatively connected to said nondestructive sense electrodes, a differential output amplifier having as input the output of said tap weighting circuitry, wherein the output of said differential output amplifier comprises a second input to said summing means;

a correlator means having as input the output of said summing means and having as output tap weight signals which correspond to the multiple paths of said training waveform, said tap weight signals operatively connected to said tap weighting circuitry;

an output means connected to the output of said summing means.

5. The device of claim 4, wherein said correlator means further comprises a tap weight accumulator operable to accumulate tap weight signals generated from successive repetitions of said training waveform, wherein the output of said accumulator comprises the output of said correlator means.

6. A storage mode heterojunction acoustic charge transport device comprising:
 - a substrate;
 - channel means disposed on said substrate;
 - charge injecting means disposed on said channel means for injecting a charge packet into said channel means;
 - acoustic wave means for injecting an acoustic wave into said channel means, said acoustic wave operable to move said charge packet along said channel means;
 - a barrier electrode disposed on said channel means and operable when energized to hold said charge packet;
 - a nondestructive sense electrode disposed on said channel means adjacent said barrier electrode, said nondestructive sense electrode positioned to sense said charge packet while it is being held by said barrier electrode.

7. The device of claim 6, further comprising a plurality of said barrier electrodes interspersed among a plurality of said nondestructive sense electrodes.

8. The device of claim 7, further comprising means for weighting the output of said nondestructive sense electrodes.

9. The device of claim 8, wherein said means for weighting is programmable.

10. The device of claim 7, further comprising means for combining the outputs of said nondestructive sense electrodes.

* * * * *